(12) United States Patent
Henry et al.

(10) Patent No.: US 6,247,122 B1
(45) Date of Patent: Jun. 12, 2001

(54) METHOD AND APPARATUS FOR PERFORMING BRANCH PREDICTION COMBINING STATIC AND DYNAMIC BRANCH PREDICTORS

(75) Inventors: G. Glenn Henry; Terry Parks, both of Austin, TX (US)

(73) Assignee: IP-First, L.L.C., Fremont, CA (US)

( * ) Notice: Subject to any disclaimer, the term of this patent is extended or adjusted under 35 U.S.C. 154(b) by 0 days.

(21) Appl. No.: 09/203,884

(22) Filed: Dec. 2, 1998

(51) Int. Cl.[7] ............................... G06F 9/42; G06F 9/30; G06F 9/38
(52) U.S. Cl. ........................ 712/239; 712/224; 712/23
(58) Field of Search ............................ 712/239, 240, 712/238, 224, 23; 709/224; 717/4; 711/137

(56) References Cited

U.S. PATENT DOCUMENTS

| | | | |
|---|---|---|---|
| 5,485,587 | * | 1/1996 | Matsuo ................................ 709/224 |
| 5,659,752 | * | 8/1997 | Heisch et al. ......................... 717/4 |
| 5,828,874 | * | 10/1998 | Steely, Jr. et al. .................. 712/240 |
| 5,978,909 | * | 11/1999 | Lempel ................................. 712/239 |
| 6,088,793 | * | 7/2000 | Liu et al. ............................. 712/239 |

OTHER PUBLICATIONS

Using Hybrid Predictors to Improve Branch Prediction Accuracy in the Presence of Context Switches, Evers et al, ISCA 5/96.
Superscalar Microprocessor Design, Mike Johnson, Prentice Hall 1991.
A System Level Perspective on Branch Architecture Performance, Calder et al 1995 IEEE.
Alternative Implementations of Hybrid Branch Predictors, Chang et al, 1995 IEEE.
The Bi–Mode Branch Predictor, Lee et al, 1997 IEEE.
Assigning Confidence to Conditional Predictiiions, Jacobsen et al, 1996 IEEE.
Gshare, 'Agrees' Aid Branch Prediction, Linley Gwennap, 11–17–97, Microprocessor Report.
Combining Branch Predictors, Scott McFarling, Jun. 1993, WRL–Technical Note TN–36.
The Agree Predictor; A Mechanism for Reducing Negative Branch History Interference, Eric Sprangle et al.

* cited by examiner

Primary Examiner—Daniel H. Pan
Assistant Examiner—Ye Ya Chen
(74) Attorney, Agent, or Firm—E. Alan Davis; James W. Huffman

(57) ABSTRACT

An apparatus and method for improving microprocessor performance by improving the prediction accuracy of conditional branch instructions is provided. A static branch predictor makes a prediction of the outcome of a conditional branch instruction based on the branch test type and the branch target address displacement sign. A branch history table stores a bit indicating whether the prediction of the static predictor agreed with the outcome of the last execution of the branch instruction. If the history table bit agrees, then the static prediction is used. Otherwise, the opposite of the static prediction is used.

41 Claims, 8 Drawing Sheets

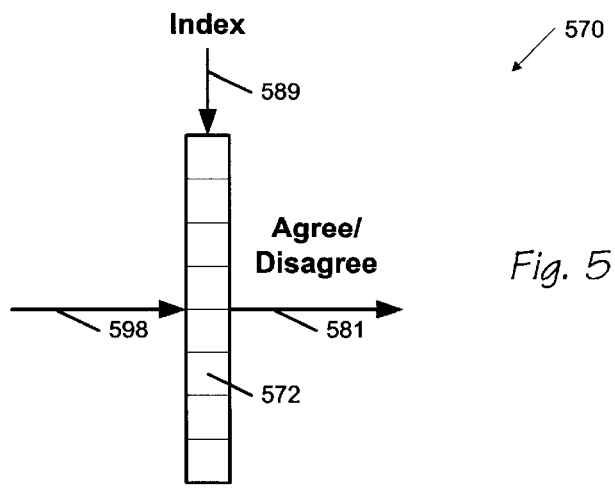
Fig. 5
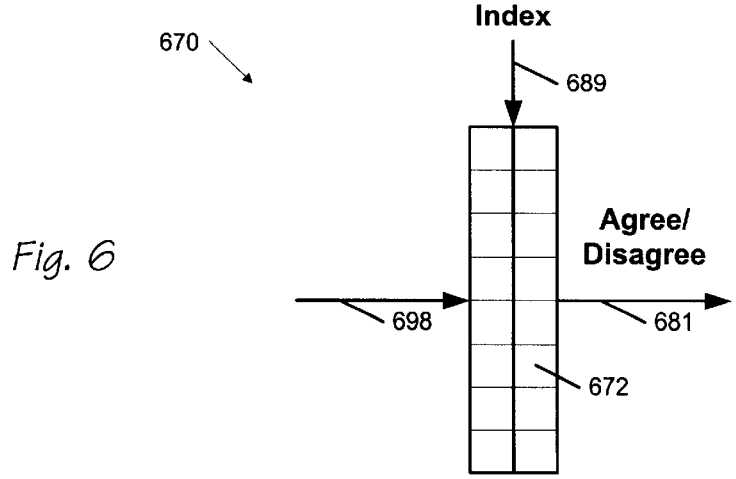
Fig. 6
Fig. 7 (Related art)
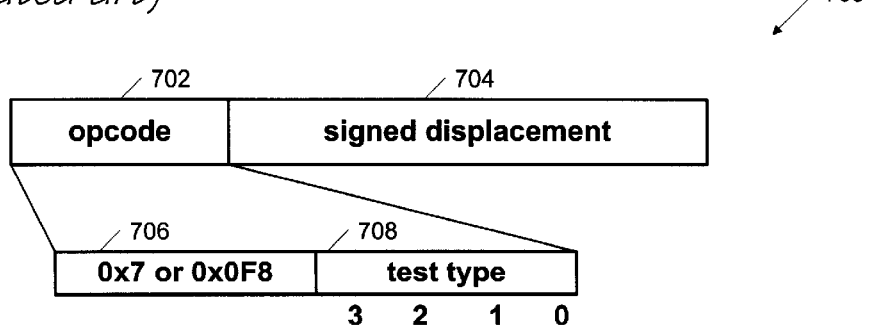

Fig. 8

| Instruction Test Type | Percentage Taken | Prediction Accuracy From Test Type |
|---|---|---|
| JO | 00.00 % | 100.00 % |
| JNO | 100.00 % | 100.00 % |
| JC | 45.08 % | 54.92 % |
| JNC | 31.94 % | 68.06 % |
| JZ | 35.60 % | 64.40 % |
| JNZ | 47.99 % | 52.01 % |
| J(C|Z) | 62.58 % | 62.58 % |
| JN(C|Z) | 31.58 % | 68.42 % |
| JS | 30.90 % | 69.10 % |
| JNS | 86.15 % | 86.15 % |
| JP | 00.00 % | 100.00 % |
| JNP | 00.00 % | 100.00 % |
| J(S^O) | 33.91 % | 66.09 % |
| JN(S^0) | 59.34 % | 59.34 % |
| J(S^0)|Z | 33.88 % | 66.12 % |
| JN(S^0)|Z | 57.25 % | 57.25 % |
| JCXZ | 29.51 % | 70.49 % |

Fig. 9

|  | Negative displacement | Positive displacement |
|---|---|---|
| In TAKEN subset | Predict TAKEN | Predict TAKEN |
| In NOT TAKEN subset | Predict NOT TAKEN | Predict NOT TAKEN |
| In neither subset | Predict TAKEN | Predict NOT TAKEN |

METHOD AND APPARATUS FOR PERFORMING BRANCH PREDICTION COMBINING STATIC AND DYNAMIC BRANCH PREDICTORS

BACKGROUND OF THE INVENTION

1. Field of the Invention

This invention relates in general to the field of microprocessors, and more particularly to a method and apparatus for performing branch prediction by combining static and dynamic branch predictors.

2. Description of the Related Art

Computer instructions are typically stored in successive addressable locations within a memory. When processed by a Central Processing Unit (CPU), the instructions are fetched from consecutive memory locations and executed. Each time an instruction is fetched from memory, a program counter within the CPU is incremented so that it contains the address of the next instruction in the sequence. This is the next sequential instruction pointer, or NSIP. Fetching of an instruction, incrementing of the program counter, and execution of the instruction continues linearly through memory until a program control instruction is encountered.

A program control instruction, when executed, changes the address in the program counter and causes the flow of control to be altered. In other words, program control instructions specify conditions for altering the contents of the program counter. The change in the value of the program counter as a result of the execution of a program control instruction causes a break in the sequence of instruction execution. This is an important feature in digital computers, as it provides control over the flow of program execution and a capability for branching to different portions of a program. Examples of program control instructions include Jump, Test and Jump conditionally, Call, and Return.

A Jump instruction causes the CPU to unconditionally change the contents of the program counter to a specific value, i.e., to the target address for the instruction where the program is to continue execution. A Test and Jump conditionally causes the CPU to test the contents of a status register, or possibly compare two values, and either continue sequential execution or jump to a new address, called the target address, based on the outcome of the test or comparison. A Call instruction causes the CPU to unconditionally jump to a new target address, but also saves the value of the program counter to allow the CPU to return to the program location it is leaving. A Return instruction causes the CPU to retrieve the value of the program counter that was saved by the last Call instruction, and return program flow back to the retrieved instruction address.

In early microprocessors, execution of program control instructions did not impose significant processing delays because such microprocessors were designed to execute only one instruction at a time. If the instruction being executed was a program control instruction, by the end of execution the microprocessor would know whether it should branch, and if it was supposed to branch, it would know the target address of the branch. Thus, whether the next instruction was sequential, or the result of a branch, it would be fetched and executed.

Modern microprocessors are not so simple. Rather, it is common for modern microprocessors to operate on several instructions at the same time, within different blocks or pipeline stages of the microprocessor. Hennessy and Patterson define pipelining as, "an implementation technique whereby multiple instructions are overlapped in execution." *Computer Architecture: A Quantitative Approach*, $2^{nd}$ edition, by John L. Hennessy and David A. Patterson, Morgan Kaufmann Publishers, San Francisco, Calif., 1996. The authors go on to provide the following excellent illustration of pipelining:

> A pipeline is like an assembly line. In an automobile assembly line, there are many steps, each contributing something to the construction of the car. Each step operates in parallel with the other steps, though on a different car. In a computer pipeline, each step in the pipeline completes a part of an instruction. Like the assembly line, different steps are completing different parts of the different instructions in parallel. Each of these steps is called a pipe stage or a pipe segment. The stages are connected one to the next to form a pipe—instructions enter at one end, progress through the stages, and exit at the other end, just as cars would in an assembly line.

Thus, as instructions are fetched, they are introduced into one end of the pipeline. They proceed through pipeline stages within a microprocessor until they complete execution. In such pipelined microprocessors it is often not known whether a branch instruction will alter program flow until it reaches a late stage in the pipeline. But, by this time, the microprocessor has already fetched other instructions and is executing them in earlier stages of the pipeline. If a branch causes a change in program flow, all of the instructions in the pipeline that followed the branch must be thrown out. In addition, the instruction specified by the target address of the branch instruction must be fetched. Throwing out the intermediate instructions, and fetching the instruction at the target address creates processing delays in such microprocessors.

To alleviate this delay problem, many pipelined microprocessors use branch prediction mechanisms in an early stage of the pipeline that predict the outcome of branch instructions, and then fetch subsequent instructions according to the branch prediction.

A popular branch prediction scheme uses a branch history table (BHT), or prediction history table (PHT) to make predictions about conditional branch instruction outcomes. One simple BHT is an array of single bits. Each bit stores the last outcome of a branch instruction. For example, the bit stores a 1 if the branch was taken the last time it was executed and a 0 if the branch was not taken the last time it was executed.

The array is indexed by the address of the branch instruction. To make a prediction for a branch instruction, a branch predictor takes the address of the branch instruction and outputs the bit from the array entry selected by the address. Thus, the prediction for a given execution of a branch instruction is the outcome of the previous execution of the branch instruction. After the branch instruction executes (i.e., once the microprocessor resolves whether the branch is taken or not) the bit indexed by the branch instruction address is updated with the actual branch instruction outcome. A branch prediction mechanism such as a branch history table is commonly referred to as a dynamic branch prediction mechanism because it keeps a history of the outcome of branch instructions as a program executes and makes predictions based upon the history.

Many computer systems today have memory address ranges on the order of gigabytes. It is not practical for the BHT to be as large as the memory space of the system in which the microprocessor operates. Common BHT sizes are 1KB to 4KB. Therefore, only a portion of the address branch instruction is used to index into the BHT. Typically, the lower address bits are used as the index. Consequently, sometimes two or more branch instructions will index into the same location in the BHT. This phenomenon is commonly referred to as aliasing. This is a similar phenomenon that occurs in caches. However, most BHT's do not have cache tags and sets. Therefore, the outcome of the newer branch will replace the outcome of the older branch. This may be detrimental if the older branch executes next, rather than the newer branch.

The aliasing phenomenon is also referred to as PHT interference, since the outcome of one branch is interfering with the subsequent prediction of another completely unrelated branch. See Eric Spangle, Robert S. Chappell, Mitch Alsup, Yale N. Patt, "The Agree Predictor: A Mechanism for Reducing Negative Branch History Interference", Proceedings of the 24th International Symposium on Computer Architecture, Denver, June 1997, which is hereby incorporated by reference.

Spangle defines interference as "a branch accessing a PHT entry that was previously updated by a different branch." He notes that interference may be positive, negative or neutral. A positive interference is one that causes a correct prediction that would otherwise have been a misprediction. A negative interference is one that causes a misprediction that would otherwise have been a correct prediction. A neutral interference is one that does not affect the correctness of the prediction. Spangle goes on to show that negative interference has a substantial impact on branch prediction accuracy overall.

Some solutions have attempted to reduce the number of interferences. One solution is to increase the size of the PHT. However, increasing the size of the PHT increases cost significantly because it requires a substantial additional amount of hardware.

Spangle proposes a solution to the interference problem that he refers to as "agree prediction." Agree prediction, rather than attempting to reduce the number of interferences, converts negative interferences to positive or neutral interferences. This is accomplished by storing different information in the PHT than the outcome of the last branch instruction.

The agree prediction scheme relies on a biasing bit. The biasing bit indicates a prediction of the outcome of the branch. However, unlike the PHT entries, the value of the biasing bit is not updated with each execution of the branch instruction. The biasing bit remains the same over the course of program execution.

With agree prediction, the bit stored in the PHT predicts whether or not the branch outcome will be correctly predicted by the biasing bit, rather than predicting the branch outcome itself. Essentially, the agree predictor predicts whether the branch outcome will "agree" with the biasing bit's prediction. Thus, each time a branch is resolved, the PHT is updated with an indication of whether the biasing bit agreed with the actual outcome.

How the agree prediction converts negative interferences to positive or neutral interferences can perhaps best be illustrated by first looking at the operation of the older scheme. For example, assume two branch instructions alias to the same entry in the PHT. Also assume one branch has an 80% taken percentage and the other branch has a 30% taken percentage. The probability that the two branches will have opposite outcomes is the probability the first branch will be taken times the probability the second branch will not be taken plus the probability the first branch will not be taken times the probability the second branch will be taken. In our example the probability is:

$$(80\% * 70\%)+(20\% * 30\%)=62\%.$$

However, in agree prediction the probability that the two branches will have opposite outcomes is a function of the prediction accuracy of the biasing bit. This probability is the probability the first branch agrees with the biasing bit times the probability the second branch disagrees with the biasing bit plus the probability the first branch disagrees with the biasing bit times the probability the second branch agrees with the biasing bit, or:

$$P_1 * (1-P_2)+(1-P_1) * P_2,$$

where $P_1$ is the prediction accuracy of the biasing bit for the first branch and $P_2$ is the prediction accuracy of the biasing bit for the second branch.

To illustrate, if the prediction accuracy of the biasing bit is 70% for each branch, then the probability that the two branches will have opposite outcomes with agree prediction is:

$$(70\% * 30\%)+(30\% * 70\%)=42\%.$$

Spangle proposed two biasing bit schemes. The first is referred to as the "first time" mechanism. The first time mechanism stores the outcome of the branch the first time it is executed and uses that outcome as the biasing bit value. For example, the biasing bit may be stored in an instruction cache or branch target buffer (BTB) of the microprocessor.

The second biasing bit scheme is referred to as the "most often" scheme. With the most often scheme, the program is executed and statistics of the branch outcomes are gathered. After the statistics are gathered, the biasing bit is given the value of the most frequent outcome for each branch. An example of a processor that uses the most often scheme is the Hewlett-Packard® PA-8500 microprocessor. See Linley Gwennap, "Gshare, 'Agrees' Aid Branch Prediction", Microprocessor Report, Nov. 17, 1997. The PA-8500 relies on dedicated static branch prediction bits in the branch instruction itself which are populated based upon previous executions of the program.

However, the first time and most often schemes have important limitations. The most often scheme requires a static branch prediction bit in the instruction format. This is not helpful for microprocessor architectures that do not have a static branch prediction bit, such as the x86 architecture instruction set.

The first time scheme requires significant additional hardware, which increases the cost of the microprocessor. The additional hardware required is directly proportional to the size of the PHT. Thus, if the size of the PHT is 4K entries, then 4K additional biasing bits must be added.

Therefore, what is needed is a cost-effective apparatus and method that predicts branch instruction outcomes in a manner that ameliorates the negative effects of aliasing but does not require dedicated static prediction bits in the instruction set.

SUMMARY

To address the above-detailed deficiencies, it is an object of the present invention to provide a more accurate method and apparatus for performing branch prediction by converting negative interference in a branch history table to positive or neutral interference.

Accordingly, in the attainment of the aforementioned object, it is a feature of the present invention to provide a branch prediction mechanism within a microprocessor having a static branch prediction mechanism and a branch history table for providing a dynamic branch predictor output. The branch prediction mechanism includes a static predictor output, provided by the static branch prediction mechanism based on a conditional branch instruction test type. The branch prediction mechanism further includes correlation logic coupled to the static branch prediction mechanism and to the branch history table. The correlation logic receives the static predictor output and the dynamic branch predictor output. The correlation logic treats the dynamic branch predictor output as an Agree/Disagree indicator for the static predictor output. The correlation logic causes the static predictor output to be used by the branch prediction mechanism if the dynamic predictor output indicates Agree.

An advantage of the present invention is that it incorporates agree prediction of branches without requiring a dedicated static prediction bit in the instruction format. Another advantage of the present invention is that it provides a cost effective agree prediction biasing bit.

In another aspect, it is a feature of the present invention to provide a microprocessor capable of performing branch prediction. The microprocessor includes instruction fetch logic that fetches a conditional branch instruction. The microprocessor further includes execution logic coupled to the instruction fetch logic that resolves an outcome of the conditional branch instruction. The microprocessor further includes a branch predictor coupled to the instruction fetch logic and the execution logic.

The branch predictor includes a static branch predictor. The static branch predictor includes a test type input that receives a test type of the conditional branch instruction specifying a condition upon which the conditional branch instruction will be taken. The static branch predictor also includes logic that receives the test type from the test type input and makes a static prediction of an outcome of the conditional branch instruction based on the test type. The static branch predictor also includes a static prediction output that indicates the static prediction.

The branch predictor also includes a branch history table. The branch history table includes an array of storage elements each of which stores an Agree/Disagree indication of whether a previous static prediction by the static branch predictor of a previous outcome of the conditional branch instruction resolved by the execution logic agreed with the previous outcome. The branch history table also includes an index input configured to receive an index for indexing into the array of storage elements. The branch history table also includes an Agree/Disagree output that indicates the Agree/Disagree indication.

The branch predictor also includes correlation logic coupled to the static branch predictor and to the branch history table that receives the static prediction output and the Agree/Disagree output and outputs the static prediction if the Agree/Disagree indication agrees with the static prediction and outputs an opposite prediction if the Agree/Disagree indication disagrees with the static prediction. The instruction fetch logic is configured to fetch a next instruction in response to the branch predictor prediction.

In yet another aspect, it is a feature of the present invention to provide a method for performing branch prediction in a microprocessor. The method includes making a static prediction of the outcome of a conditional branch instruction based on a test type of the conditional branch instruction specifying a condition upon which the conditional branch instruction will be taken. The method also includes providing an Agree/Disagree indication of whether a previous static prediction of a previous outcome of the conditional branch instruction agreed with the previous outcome. The method also includes outputting the static prediction if the Agree/Disagree indication agrees with the static prediction and outputting an opposite outcome if the Agree/Disagree indication disagrees with the static prediction.

BRIEF DESCRIPTION OF THE DRAWINGS

These and other objects, features, and advantages of the present invention will become better understood with regard to the following description, and accompanying drawings where:

FIG. 5 is a block diagram of one embodiment of the history table of FIG. 3.

FIG. 6 is a block diagram of a second embodiment of the history table of FIG. 3.

FIG. 7 is a table illustrating a typical branch instruction format that includes opcode and displacement fields, but does not include static prediction bits.

FIG. 8 is a table showing percentages of taken branches for various conditional jump instruction test types collected in relation to the present invention.

FIG. 9 is a truth table illustrating a method of providing agree prediction biasing bits according to the present invention.

DETAILED DESCRIPTION

Figure 1:
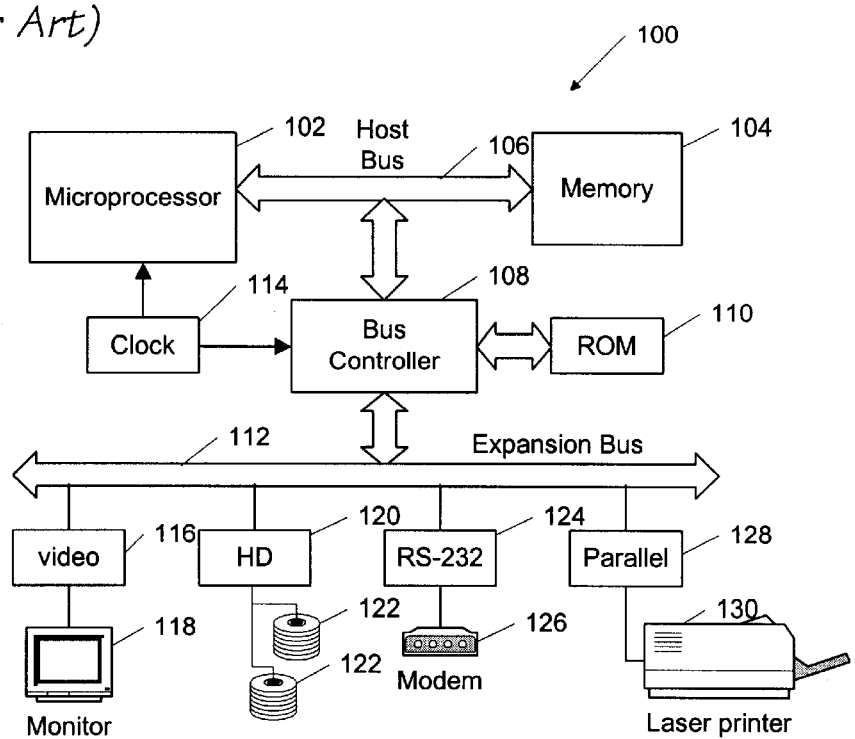
FIG. 1 is a prior art block diagram of a computer system that can incorporate a microprocessor according to the present invention.

Referring to FIG. 1, a block diagram of a typical computer system 100 is shown. The computer system 100 includes a microprocessor 102 connected to a memory 104 via a host bus 106. Also connected to the microprocessor 102 and the memory 104 via the host bus 106 is a bus controller 108. The bus controller 108 provides an interface between the host bus 106 and a ROM 100, and an expansion bus 112. A system clock 114 is provided to both the microprocessor 102 and the bus controller 108. Connected to the expansion bus 112 is a monitor 118 via a graphics controller 116, hard disk drives 122 via a disk interface 120, a modem 126 via an RS-232 interface 124, and a printer 130 via a parallel port 128.

In operation, the microprocessor 102 executes instructions, including branch instructions, retrieved from either the memory 104, the ROM 110 or the hard disks 122. The microprocessor can retrieve data from or store data to the memory 104 or the hard disks 122. In addition, the microprocessor 102 can send data to either the modem 126 or the printer 130. The monitor 118 provides a user interface to the microprocessor 102. The computer system 100 is typical of the type of computing system environment into which a processor according to the present invention may be used.

Figure 2:
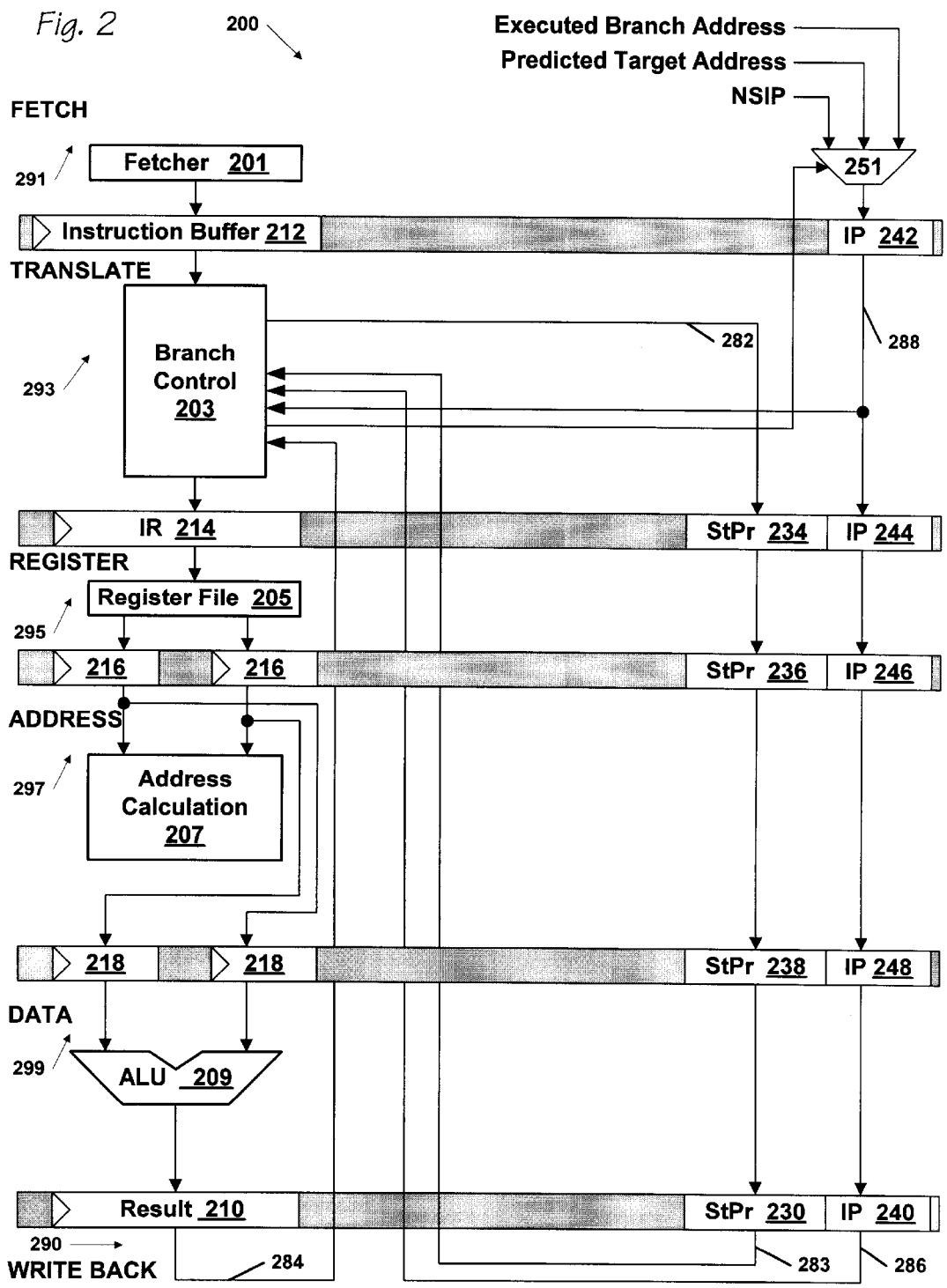
FIG. 2 is a block diagram of a pipeline microprocessor according to the present invention and in particular a branch predictor illustrated in FIG. 3.

Referring now to FIG. 2, a six-stage pipeline microprocessor 200 according to the present invention is shown. The microprocessor 200 comprises fetch 291, translate 293, register 295, address 297, data 299 and write back 290 stages coupled together to form a pipeline through which instructions are processed.

The fetch stage 291 includes a fetcher 201, which fetches instructions that are to be executed by the microprocessor 200. The fetcher 201 fetches instructions according to the contents of an instruction pointer (IP) 242 and places the instructions into an instruction buffer 212. Normally the IP 242 includes the value of a next sequential instruction pointer (NSIP), which is the address of the previous instruction plus the size of the previous instruction. However, when a branch instruction is taken, the executed target address is provided to the IP 242 to indicate the change in program flow effected by the branch instruction. Additionally, if it is predicted that a conditional branch instruction will be taken, the predicted target address of the branch instruction is provided to the IP 242. This enables the fetch stage 291 to fetch as the next instruction the instruction at the branch target address rather than the instruction in the next sequential memory location. A branch control 203 in the translate stage 293 selects, via a mux 251, the contents to be loaded into the IP 242.

The translate stage 293 translates or decodes the fetched macro instructions, such as conditional branch instructions, in the instruction buffer 212 into a sequence of micro operations that may be executed by the microprocessor 200. The micro operations are placed into an instruction register (IR) 214. The translate stage 293 includes branch control 203 which, among other things, makes predictions about the outcome of conditional branch instructions.

The branch control 203 receives the address of branch instructions from the IP 242 via signal 288 and makes a prediction of the outcome of the branch instruction based upon the branch instruction address. The branch instruction address is piped down with the branch instruction through the various stages of the pipeline via registers 244, 246, 248 and 240. The branch control 203 receives the branch instruction address, which was piped down along with the branch instruction, via signal 286 and uses the branch instruction address to update a branch history table within the branch control 203 (described in FIG. 3). Preferably, the branch control 203 also makes predictions based upon a static branch predictor, discussed in more detail below.

The branch control 203 indicates the prediction of the outcome of a conditional branch made by its static predictor on prediction signal 282. The prediction is stored in a static prediction (StPr) register 234. The static prediction is piped down with the conditional branch instruction through the various stages of the pipeline via static prediction registers 236, 238 and 230. The static prediction is provided from the last static prediction register 230 in the pipeline to branch control 203 so that branch control 203 may later compare the static prediction with the branch outcome to determine if the static prediction was correct.

The register stage 295 retrieves operands specified by the micro operations from a register file 205 for use by later stages in the pipeline. Preferably, the register file 205 includes a status flags register that is used in determining whether branch conditions have been satisfied.

The address stage 297 calculates memory addresses specified by micro operations, to be used in data storage and retrieval operations. In one embodiment, the branch target address of the branch instruction is calculated in the address stage 297 by address calculation unit 207. In another embodiment, the branch target address is calculated in the translate stage. For a description of branch target address calculation in the translate stage see U.S. patent application Ser. No. 08/962,344 entitled "Method and Apparatus for Branch Address Calculation During Decode" filed Oct. 31, 1997 by G. Glenn Henry and Terry Parks, which is hereby incorporated by reference.

The data/ALU stage 299 either performs ALU operations on data retrieved from the register file 205, or reads/writes data from/to memory using the memory address calculated in the address stage 297. The data/ALU stage 299 also resolves the outcomes of conditional branch instructions. That is, the data/ALU stage 299 determines whether or not the condition upon which the conditional branch instruction will branch has been met. An example of a branch condition is whether or not a particular flag in a status register is set or clear, such as a carry flag or an overflow flag. The data/ALU stage 299 provides the result, or outcome, of the determination of the condition to a result register 210.

The write back stage 290 writes the result of a data read operation, or an ALU operation, to the register file or to a memory location. The write back stage 290 also provides the result of the conditional branch outcome to branch control 203 via signal 284. This enables branch control 203 to compare the outcome with the static prediction to see if they agree or disagree.

Figure 3:
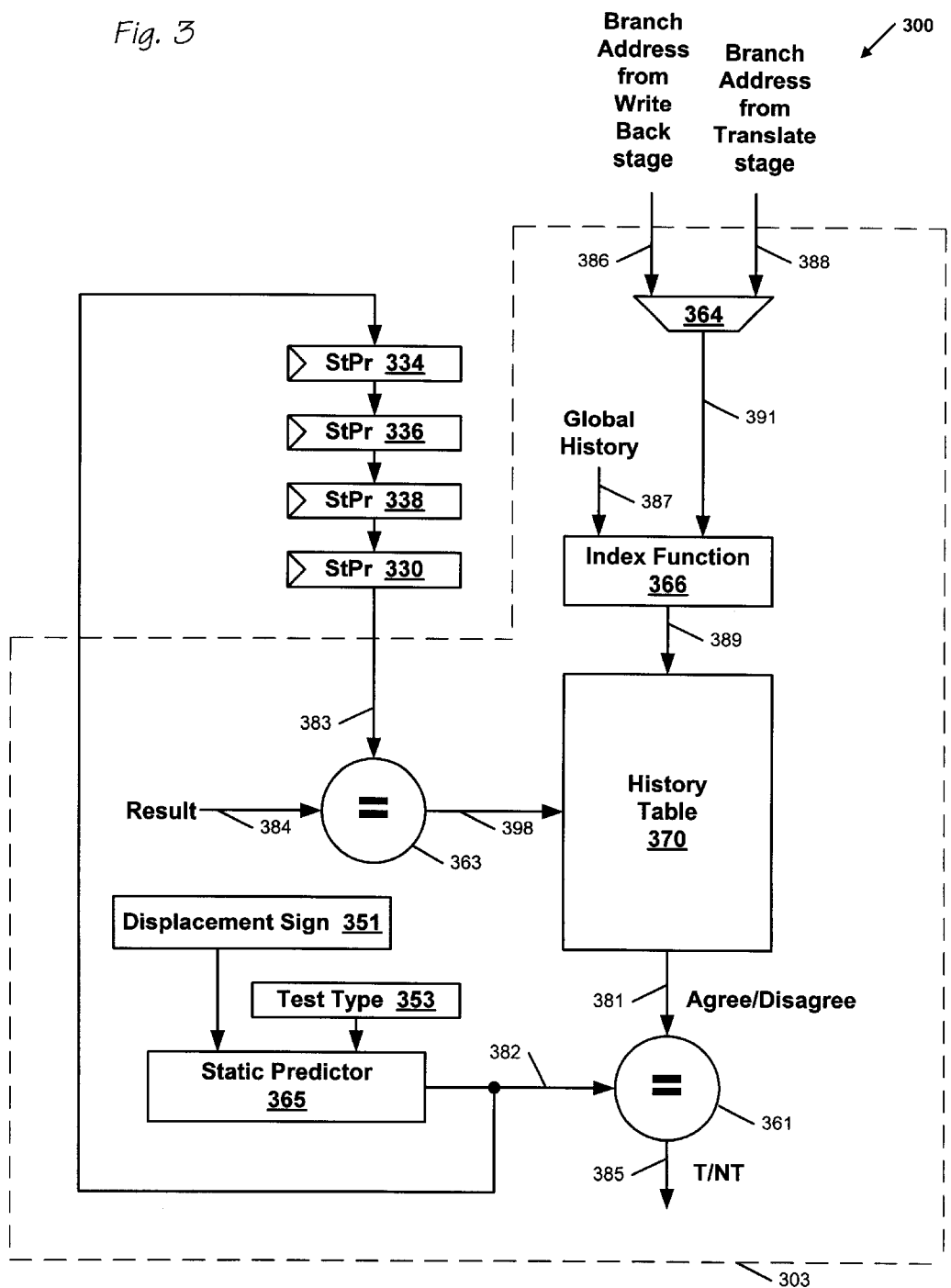
FIG. 3 is a block diagram of a branch predictor according to the present invention.

Referring now to FIG. 3, a block diagram of a branch prediction mechanism 300, or branch predictor 300, according to the present invention is shown. Like elements with FIG. 2 have been identified by like numbers, with the hundreds digit being replaced by a 3. The branch predictor 300 comprises branch control 303, and static prediction registers 334, 336, 338 and 330 coupled to branch control 303.

The branch predictor 300 comprises a static branch predictor 365. With a static branch predictor, such as static branch predictor 365, the prediction remains the same for a given branch instruction throughout the entire execution of the program in which the branch instruction is contained. That is, if the static branch predictor 365 predicts a given branch will be taken the first time the branch instruction is executed, the static branch predictor 365 will predict the branch will be taken every time the branch instruction is executed throughout the execution of the program. Thus, the prediction made by a static branch predictor does not depend upon the dynamic behavior of the branch instruction. Advantageously, the static branch predictor 365 makes static predictions based upon the test type and displacement sign of the conditional branch instruction rather than a static prediction bit in the instruction itself.

The branch predictor 300 further comprises a history table 370. The history table 370 stores Agree/Disagree branch prediction information based on a history of previous branch instruction outcomes and their comparisons with the static predictions.

The history table 370 comprises an array of storage elements. Two embodiments of the history table 370 are described below with respect to FIGS. 5 and 6. The history table 370 generates an Agree/Disagree prediction 381 (or dynamic branch predictor). The Agree/Disagree prediction 381 is a dynamic branch predictor since it provides a prediction based upon a history of the outcome of branch instructions stored in the history table 370.

The history table 370 is updated via signal 398. Signal 398 is the output of comparator 363. Comparator 363 compares the result 384, or outcome, of the conditional branch instruction and the static prediction 383 made previously by a static predictor 365. The static prediction 383 is received from static prediction register 330 by the comparator 363.

The history table 370 array is indexed by a signal 389 received from an index function unit 366. The index function unit 366 receives two inputs. The first input is a global branch history 387. The global branch history 387 comprises the last n conditional branch instruction outcomes. Preferably, the global branch history is speculatively updated to improve branch prediction performance as described in U.S. patent application Ser. No. 09/203,844 entitled "METHOD AND APPARATUS FOR SPECULATIVELY UPDATING GLOBAL BRANCH HISTORY" (IDT:1391) filed concurrently herewith, by G. Glenn Henry, Dinesh K. Jain, and Gerard Col.

The second input received by the history table 370 is the conditional branch instruction address via signal 391 that is the output of mux 364. When the prediction is to be read from the history table 370, branch control 303 controls mux 364 to select the conditional branch instruction address from the translate stage via signal 388. When the history table 370 is to be updated with the outcome of the branch, branch control 303 controls mux 364 to select the conditional branch instruction address which has been piped down to the write back stage via signal 386.

The branch predictor 300 further comprises a static predictor 365 that receives a displacement sign 351 and a test type 353 of the conditional branch instruction. The static predictor 365 makes a prediction of the outcome of the branch instruction on static prediction signal 382 based on the displacement sign 351 and test type 353, as will be described in more detail below. The static prediction 382 is provided to static prediction register 334 for storage. The static prediction 382 is piped down through static prediction registers 336, 338 and 330 for eventual provision to comparator 363.

The static prediction signal 382 is provided to a comparator 361 along with Agree/Disagree prediction 381. The comparator 361 correlates the two predictions by generating a taken/not taken (T/NT) prediction signal 385 based upon a comparison of the static predictor 382 and the Agree/Disagree dynamic branch prediction 381. If the Agree/Disagree prediction 381 agrees with the static predictor output 382, the comparator outputs the static predictor 382 value. If the Agree/Disagree prediction 381 disagrees with the static predictor 382, the comparator outputs the inverse of the static predictor 382 value.

The T/NT prediction signal 385 is used by branch control 203 to control mux 251 for selecting either the predicted target address or NSIP. If the T/NT prediction signal 385 indicates taken, mux 251 selects the predicted target address. If the T/NT prediction signal 385 indicates not taken, mux 251 selects the NSIP. If the NSIP was selected and the prediction was wrong, branch control 203 controls mux 251 to select the executed branch address.

As may be observed, the static predictor 365 advantageously provides a static prediction 382 which serves as a biasing bit for combination with Agree/Disagree prediction 381 to perform agree prediction. The static predictor 365 advantageously provides the biasing bit based upon the conditional branch instruction without requiring static prediction bits in the instruction itself. Furthermore, the static predictor 365 advantageously provides the biasing bit without requiring extensive additional hardware, as will become apparent below. Thereby, the static predictor 365 provides the biasing bit at a minimal cost increase.

Figure 4A:
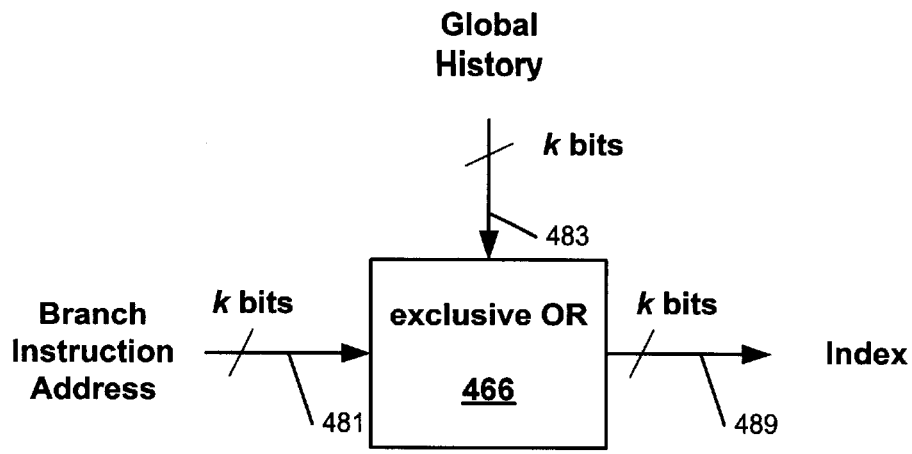
FIG. 4 (FIGS. 4A and 4B collectively) are block diagrams of two embodiments of the index function of FIG. 3.
Figure 4B:
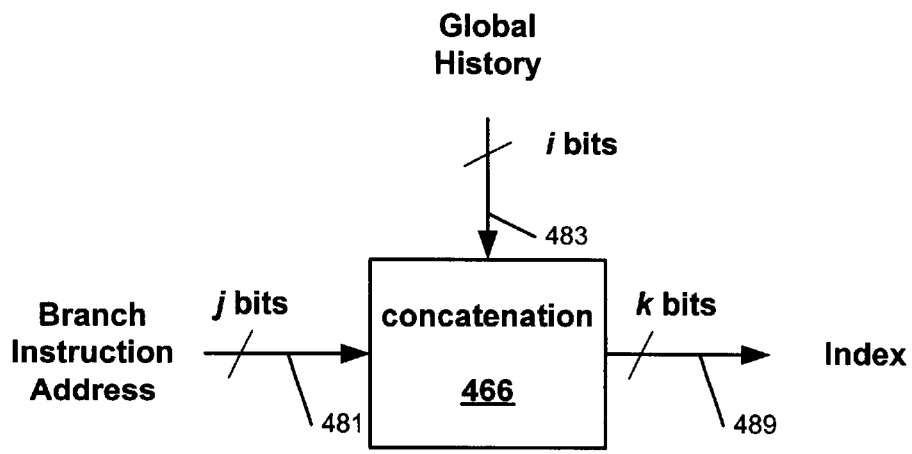

Referring now to FIG. 4 (FIGS. 4A and 4B collectively), two embodiments of the index function 466 are shown. Like elements with FIG. 3 have been identified by like numbers, with the hundreds digit being replaced by a 4.

As discussed previously, it has been observed that the behavior of a given branch instruction in a program is often correlated with the behavior of other branch instructions in the program. By examining both the local history of a given conditional branch instruction and the global history of the last n branch instructions executed, some of the dependencies between different branches are recognized and an improvement in the prediction accuracy is generally achieved. Examining both the local and global histories may be achieved by combining in some manner the branch instruction address and the global branch history to index into the branch history table. For a more detailed description of this concept see Scott McFarling, "Combining Branch Predictors", WRL technical Note TN-36, Digital Equipment Corp., 1993.

FIG. 4A illustrates an exclusive OR index function 466. The global history 483 and the branch instruction address 481 are exclusive OR'ed together to produce the index 489. Preferably, the branch instruction address 481 comprises the lower order k bits of the branch instruction address, where the number of entries in the history table 370 is $2^k$.

FIG. 4B illustrates a concatenation index function 466. The global history 483 and the branch instruction address 481 are concatenated together to produce the index 489. Preferably, lower order j bits of the branch instruction address 481 are concatenated with the i bits of the global history 483 to produce a k-bit wide index 489. That is, k will be the sum of i and j, where the number of entries in the history table 370 is $2^k$.

Referring now to FIG. 5 a first embodiment of the history table 370 of FIG. 3 is shown. Like elements with FIG. 3 have been identified by like numbers, with the hundreds digit being replaced by a 5. The history table 570 comprises an array of $2^k$ storage elements 572, where k is the number of index 589 bits received by the history table 570. Each storage element 572 comprises a single bit and the update signal 598 and the Agree/Disagree prediction 581 comprise single bits. As described above, the bit indicates whether the outcome the last time the conditional branch instruction was executed agreed or disagreed with its static prediction.

Referring now to FIG. 6 a second embodiment of the history table 370 of FIG. 3 is shown. Like elements have been identified by like numbers, with the hundreds digit being replaced by a 6. History table 670 is similar to history table 570 of FIG. 5 except each array entry comprises a plurality of bits instead of a single bit. FIG. 6 shows each array comprising two bits. Thus, the prediction 681 is two bits wide.

In one embodiment, each array entry comprises a two-bit saturating up-down counter. Each time the update signal 689 indicates the static prediction and the outcome agree, the counter increments, saturating at $11_2$. Each time the update signal 689 indicates the static prediction and the outcome disagree, the counter decrements, saturating at $00_2$. Thus, the prediction 682 may be one of four values: 00=strongly disagree, 01=disagree, 10=agree, 11=strongly agree.

Referring now to FIG. 7, a table illustrating a typical branch instruction format that includes opcode and displacement fields, but does not include static prediction bits, is shown. The conditional jump instruction specifies the test type of the branch condition in an opcode field 702. The opcode field 702 comprises a value 706 which identifies the instruction as a conditional jump instruction and four bits which identify the test type 708 of the instruction, thereby enabling sixteen different test types to be specified in a Jcc instruction. These test types are specified on page 25–190 of the Intel Pentium Processor Family Developer's Manual Volume 3: Architecture and Programming Manual, 1995, which is hereby incorporated by reference.

The Jcc instruction also specifies a displacement field 704 for calculating a branch target address. The value 706 that identifies the instruction as a conditional jump instruction is 0×7 for a Jcc with 8-bit displacement and 0×0F8 for a Jcc with 16-bit or 32-bit displacement as specified on page 25–190 of the above-referenced Pentium manual.

Referring now to FIG. 8, the table 800 shows percentages of taken branches for various test types of x86 conditional jump instructions. The table comprises empirical data collected by the present inventors from execution on an x86 processor of popular application programs such as Microsoft® Excel, Word, PowerPoint, and Access as well as Lotus® 1-2-3, WordPerfect®, and Netscape®. The present inventors have advantageously observed that some test types of x86 conditional jump instructions are strongly biased toward one outcome or the other.

Although one embodiment of the invention is described with respect to an x86 macro-instruction processor, it will be clear to one skilled in the art that the present invention may be applied to other microprocessor architectures which do not have static prediction bits in their instruction formats. Furthermore, one skilled in the art will appreciate that the present invention may be applied with other test type subsets. Therefore, the present disclosure is not intended to be limited to application within the x86 architecture. Furthermore, although embodiments are described which predefine subsets of test types for which branches are statically predicted to be taken or not taken, the present disclosure is not limited to the particular subsets described. Rather, the present invention is directed broadly to the static prediction of branch outcome based on the test type of the branch instruction for use as bias bits in an agree prediction mechanism. Furthermore, the present invention is directed to the static prediction of branch outcome based on the combination of test type and target address displacement sign for use as bias bits in an agree prediction mechanism.

The test types for which data was collected correspond to the x86 architecture test types and are designated in table 800 according to commonly recognized x86 instruction mnemonics. The test types are overflow (JO), not overflow (JNO), carry (JC), not carry (JNC), zero (JZ), not zero (JNZ), carry or zero (J(C|Z)), not carry or zero (JN(C|Z)), sign (JS), not sign (JNS), parity (JP), not parity (JNP), sign and overflow not equal (J(S^O)), sign and overflow equal (JN(S^O)), sign and overflow not equal or zero (J(S^O)|Z), sign and overflow equal or zero (JN(S^O)|Z), and CX register zero (JCXZ). The test types correspond to status flag bits in the EFLAGS register of x86 architecture processors. It is noted that a given processor may support other test types and one skilled in the art will recognize the present invention is not limited to a particular set of test types supported by a microprocessor employing the present invention.

For each test type, the percentage of branches taken for each test type is shown in the middle column. Also shown in the far right column is the percentage of correct predictions that may be made solely by examining the test type. This value is simply the maximum of the middle column and the difference between 100% and middle column. It is noted that the sample size for some test types, such as the parity (JP) and not parity (JNP) test types, may be statistically insufficient to draw an inference regarding the predictability of these test types.

As may be observed, for a first subset of the test types, the branch outcomes are biased toward taken, such as JNO, JNS and J(C|Z). Conversely, for a second subset of the test types, the branch outcomes are biased toward not taken, such as JNC, JZ, JN(C|Z), J(S^O) and J(S^O)|Z. For a third subset of test types, the bias is relatively small, such as JC, JNZ, JN(S^O) and JN(S^O)|Z. For the third subset, employing the displacement to make a static prediction is likely to produce a better bias for the agree predictor. This observation is advantageous in performing static branch prediction to serve as biasing bits in an agree prediction mechanism and improving the overall performance of microprocessors as described in this invention. Branch prediction based solely upon a static prediction based upon test types and displacement sign are described in related U.S. patent application Ser. No. 09/203,900 entitled "METHOD AND APPARATUS FOR PERFORMING BRANCH PREDICTION UTILIZING BRANCH TEST TYPE" (IDT:1392), assigned to a common assignee, concurrently filed with the present application and incorporated by reference herein.

Referring now to FIG. 9, a truth table 900 is shown illustrating a method of providing agree prediction biasing bits according to the present invention. The actions shown, "predict TAKEN" and "predict NOT TAKEN", are in response to two inputs: the sign of the displacement of a conditional branch instruction and the test type of the branch instruction. From the test type of the branch instruction a determination is made of whether the test type falls within one of two subsets of test types which a microprocessor's instruction set supports: a TAKEN subset and a NOT TAKEN subset. For example, the TAKEN subset may include the first subset described in the previous paragraph and the NOT TAKEN subset may include the second subset described in the previous paragraph.

As may be observed from the table 900, if the test type falls within the TAKEN subset, then the branch instruction is predicted taken. Conversely, if the test type falls within the NOT TAKEN subset, then the branch instruction is predicted not taken. Finally, if the test type does not fall within either subset then the sign of the branch target address displacement is used to make the prediction. If the sign is negative then the branch is predicted taken. If the sign is positive then the branch is predicted not taken.

In one embodiment, based on table 800 of FIG. 8, the TAKEN subset comprises not overflow (JNO) and not sign (JNS) and the NOT TAKEN subset comprises overflow (JO). These subsets are chosen on the recognition that the accuracy of the branch prediction based upon the test type alone may be superior to the accuracy based solely on the direction of the target address if the branch is taken. However, as previously stated, the present invention is not limited to the specific embodiments discussed. Advantageously, the method of the present invention performs branch prediction statically by examining the test type and displacement sign, without the use of static prediction bits in the branch instruction and without an additional array of biasing bits such as is required for "first time" agree prediction.

Figure 10:
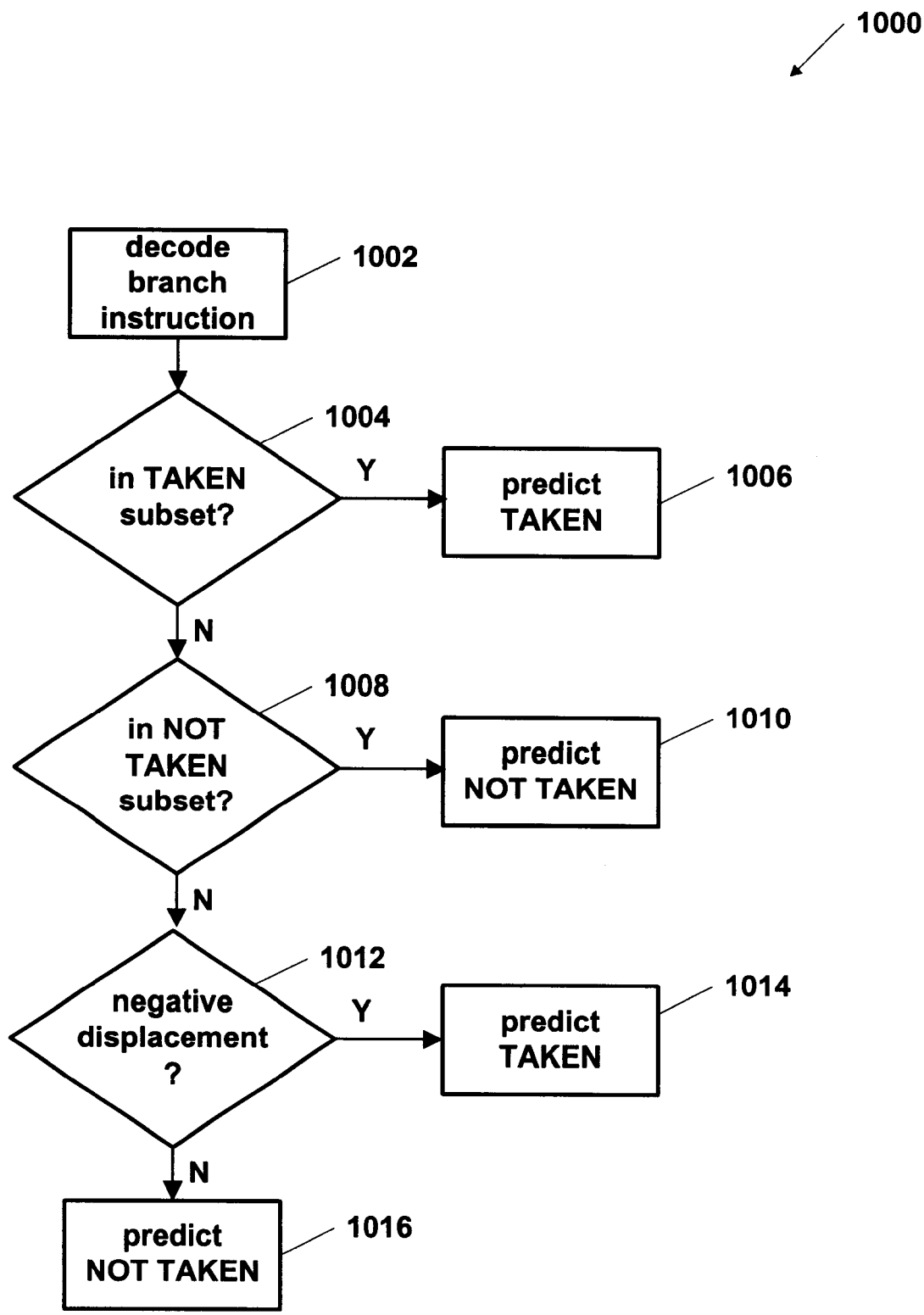
FIG. 10 is a flow chart illustrating execution of the static branch predictor of FIG. 3 within the microprocessor of FIG. 2.

Referring now to FIG. 10, a flow chart 1000 illustrating execution of the static branch predictor 365 of FIG. 3 within microprocessor 200 of FIG. 2 is shown. In step 1002, the static predictor 365 decodes the branch instruction, in particular the test type 353 and displacement sign 351 of the branch instruction, provided to it from the instruction buffer 212 of FIG. 2.

In step 1004, the static predictor 365 determines if the test type 353 is in the TAKEN subset of test types. For example, if the TAKEN subset comprises the not overflow and not sign test types, then the static predictor 365 determines if the four bits of the test type 353 match the hexadecimal values 0x1 or 0x9, respectively. The values 0x1 and 0x9 correspond to the lower nibble of the JNO and JNS conditional jump instructions as specified in the Pentium Programmer's manual. If the test type 353 is in the TAKEN subset, the static predictor 365 generates a value on the static prediction signal 382 of FIG. 3 indicating a prediction that the jump will be taken, in step 1006.

In step 1008, the static predictor 365 determines if the test type 353 is in the NOT TAKEN subset of test types. For example, if the NOT TAKEN subset comprises the overflow test type, then the static predictor 365 determines if the four bits of the test type 353 match the hexadecimal value 0x0. The value 0x0 corresponds to the lower nibble of the JO conditional jump instruction as specified in the Pentium Programmer's manual. If the test type 353 is in the NOT TAKEN subset, the static predictor 365 generates a value on the static predictor output 382 indicating a prediction that the jump will not be taken, in step 1010.

If the test type 353 is not in the TAKEN or NOT TAKEN subsets, then the static predictor 365 makes a prediction based upon the displacement of the jump instruction. In step 1012, the static predictor 365 determines if the sign of the displacement 351 is negative. If the sign 351 is negative, then the static predictor 365 generates a value on the static predictor output 382 indicating a prediction that the jump will be taken, in step 1014. If the sign 351 is positive, then the static predictor 365 generates a value on the static predictor output 382 indicating a prediction that the jump will not be taken, in step 1016.

Figure 11:
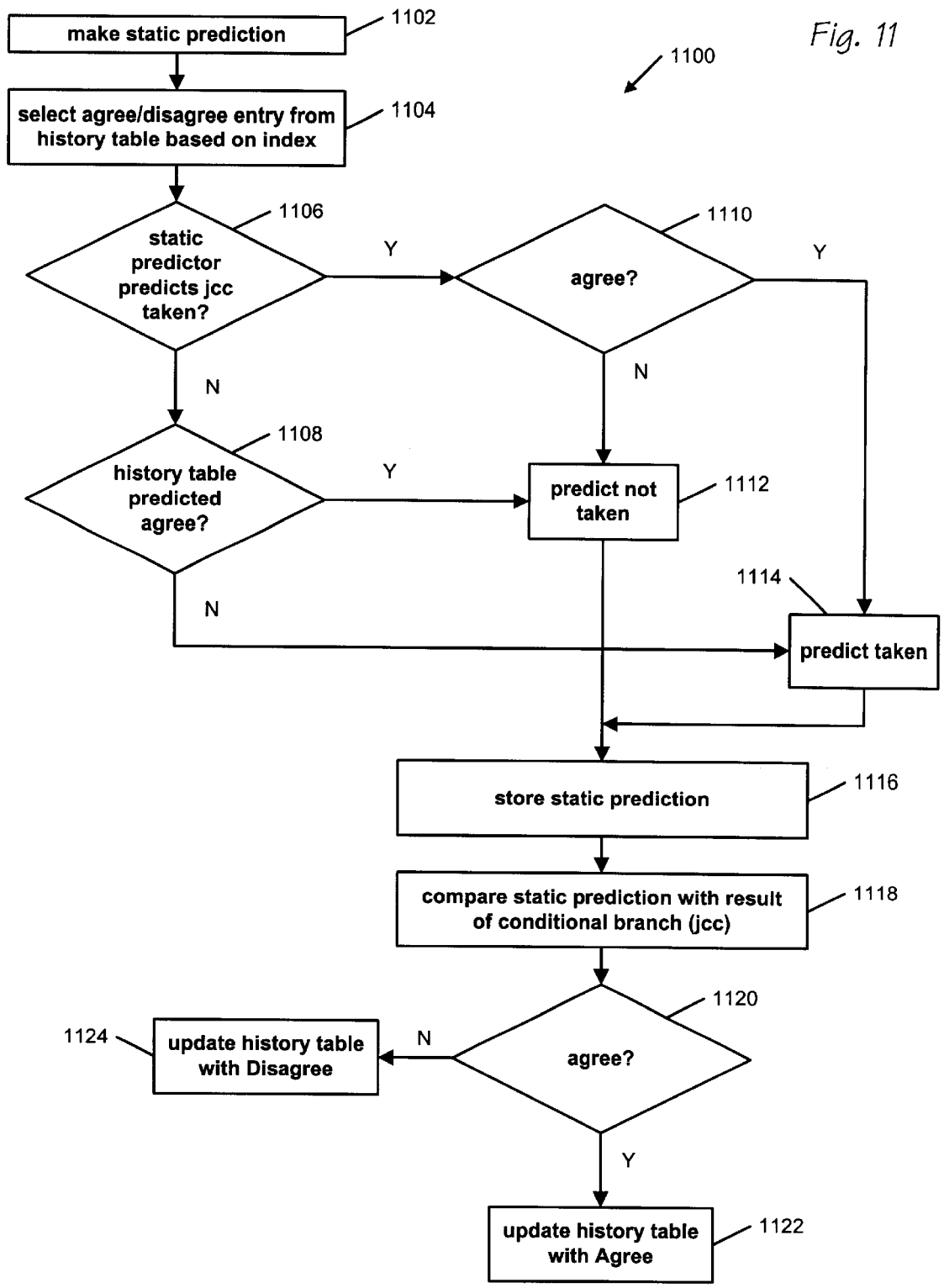
FIG. 11 is a flow chart illustrating steps executed by the microprocessor of FIG. 2 and branch predictor of FIG. 3 in the method of the present invention.

Referring now to FIG. 11, a flow chart illustrating steps executed by the microprocessor 200 of FIG. 2 and branch predictor 300 of FIG. 3 in the method of the present invention is shown.

In step 1102, the static predictor 365 makes a static prediction 382 of the outcome of a conditional branch instruction based upon the test type 353 and, if necessary, displacement sign 351. The static predictor 365 makes the static prediction 382 as described in FIG. 10.

In step 1104, the conditional branch instruction address 388 is provided to mux 364 and selected onto dynamic prediction 381 for provision to index function 366 along with global history 387. The index function 366 provides an index 389 to history table 370 based upon its function. The index selects one of the Agree/Disagree entries in the history table 370.

In step 1106, the comparator 361 determines if the static predictor 365 predicted the conditional branch instruction taken. In step 1108, if the static predictor 365 predicted not taken, the comparator 361 determines if the history table 370 predicted Agree. In step 1114, if the static predictor 365 predicted not taken and the history table 370 predicted Disagree, then the comparator 361 generates a taken value on T/NT signal 385. In step 1112, if the static predictor 365 predicted not taken and the history table 370 predicted Agree, then the comparator 361 generates a not taken value on T/NT signal 385.

In step 1110, if the static predictor 365 predicted taken, the comparator 361 determines if the history table 370 predicted Agree. In step 1112, if the static predictor 365 predicted taken and the history table 370 predicted Disagree, then the comparator 361 generates a not taken value on T/NT signal 385. In step 1114, if the static predictor 365 predicted taken and the history table 370 predicted Agree, then the comparator 361 generates a taken value on T/NT signal 385.

In step 1116, the static prediction 382 is stored in static prediction register 334. In step 1118, after the conditional branch instruction has been resolved by a later stage in the pipeline, such as data stage 299, the outcome, or result 384, is compared by comparator 363 with the static prediction 383 stored in static prediction register 330.

In step 1120, the comparator 363 determines whether the outcome 384 and static prediction 383 agree. In step 1122, if the outcome 384 and static prediction 383 agree, then the history table 370 is updated with an Agree value. In step 1124, if the outcome 384 and static prediction 383 disagree, then the history table 370 is updated with a Disagree value.

The following example illustrates how the present invention converts negative interference in a branch history table to positive or neutral interference by reducing the probability that two conditional branch instructions will have opposite outcomes, thereby improving the branch prediction accuracy. Assume a JNS and a JNC instruction alias to the same location in the history table 370 of FIG. 3. According to the table of FIG. 8, the JNS instruction is taken 86.15% of the time, whereas the JNC instruction is taken only 31.94% of the time. With the conventional scheme, the probability that the two branches will have opposite outcomes is:

$$(86.15\% * 68.06\%)+(13.85\% * 31.94\%)=63.06\%$$

However, with the present invention, assume the JNS instruction is in the TAKEN subset of FIG. 9 and therefore predicted taken by the static predictor 365, and the JNC instruction is in the NOT TAKEN subset and therefore predicted not taken by the static predictor 365. Then the probability that the two branches will have opposite outcomes is:

$$(86.15\% * 31.94\%)+(13.85\% * 68.06\%)=36.94\%.$$

Thus, the probability of negative interference in the above example is reduced by 27%.

Although the present invention and its objects, features, and advantages have been described in detail, other embodiments are encompassed by the invention. For example, variations on pipeline architecture exist, which combine some stages described in the present invention into a single stage, or separate one of the described stages into two or more stages. In addition, some microprocessors reorder the stages described as needed. The number or order of pipeline stages is not significant to the operation of the present invention. Rather, it is the static branch prediction accuracy improvement obtained by providing a static prediction to serve as a biasing bit for an agree predictor by examining the test type of the branch instruction that is of interest. It is also the advantage that neither dedicated static prediction bits in the instruction nor a large array of biasing bits are required that is of interest. Moreover, various combinations of test types may be employed to comprise the TAKEN and NOT TAKEN subsets without departing from the spirit and scope of the present invention. Additionally, it is the branch prediction accuracy improvement obtained by examining the displacement sign in addition to the test type if the test type does not provide sufficient bias that is of interest.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A branch prediction mechanism within a microprocessor, the branch prediction mechanism having a static branch prediction mechanism, and a branch history table for providing a dynamic branch predictor, the branch prediction mechanism comprising:

a static predictor, provided by the static branch prediction mechanism based on a conditional branch instruction test type;

correlation logic coupled to the static branch prediction mechanism and to the branch history table, configured to receive said static predictor and the dynamic branch predictor, said correlation logic configured to treat the dynamic branch predictor as an Agree/Disagree indicator for said static predictor;

wherein said correlation logic causes said static predictor to be used by the branch prediction mechanism if the dynamic predictor indicates Agree.

2. The branch prediction mechanism of claim 1, wherein said static predictor is provided by the static branch prediction mechanism based on whether said conditional branch instruction test type is in at least one predefined subset of test types of the microprocessor's instruction set.

3. The branch prediction mechanism of claim 2, wherein each of said at least one predefined subset of test types comprises at least one of the following test types and combinations thereof: overflow, zero, carry, parity and sign.

4. The branch prediction mechanism of claim 1, wherein said static predictor is provided by the static branch prediction mechanism based on a conditional branch instruction target address displacement sign in addition to said test type.

5. The branch prediction mechanism of claim 4, wherein said static predictor indicates the conditional branch instruction will be taken if said displacement sign is negative and said test type is not in any of said at least one predefined subset of test types.

6. The branch prediction mechanism of claim 1, further comprising:

a storage element configured to store a prediction of an outcome of the conditional branch instruction made on said static predictor; and update logic configured to compare said prediction stored in said storage element with said outcome and to update the history table with an Agree indication if said prediction stored in said storage element and said outcome are the same and to update the history table with an Disagree indication if said prediction stored in said storage element and said outcome are the not same.

7. The branch prediction mechanism of claim 1, wherein the history table comprises an array of storage elements for storing an Agree/Disagree associated with said static predictor, wherein the history table is indexed by a portion of an address of the conditional branch instruction, wherein two or more conditional branch instructions alias to a single one of said array of storage elements.

8. The branch prediction mechanism of claim 1, wherein the dynamic branch predictor comprises one or more bits.

9. The branch prediction mechanism of claim 1, wherein an instruction set of the microprocessor is an x86 instruction set.

10. An apparatus for performing branch prediction in a microprocessor, comprising:

a static branch predictor comprising:

a test type of a conditional branch instruction specifying a condition upon which said conditional branch instruction will be taken;

logic configured to receive said test type to make a static prediction of an outcome of said conditional branch instruction based on said test type;

a branch history table comprising:

an array of storage elements each configured to store an Agree/Disagree indication of whether a previous static prediction by said static branch predictor of a previous outcome of said conditional branch instruction agreed with said previous outcome of said conditional branch instruction;

an index for indexing into said array of storage elements; and an Agree/Disagree output configured to indicate said Agree/Disagree indication; and correlation logic coupled to said static branch predictor and to said branch history table configured to receive said static prediction and said Agree/Disagree output and to output said static prediction if said Agree/Disagree indication agrees with said static prediction and to output an opposite output if said Agree/Disagree indication disagrees with said static prediction.

11. The apparatus of claim 10, wherein said logic is configured to make said static prediction based on whether said conditional branch instruction test type is in at least one redefined subset of test types of the microprocessor's instruction set.

12. The apparatus of claim 11, wherein said at least one predefined subset of test types comprises at least one of the following test types and combinations thereof:

overflow, zero, carry, parity and sign.

13. The apparatus of claim 11, wherein said static branch predictor further comprises:

a displacement sign of said conditional branch instruction, wherein said logic is configured to make said static prediction of said outcome of said conditional branch instruction based on said displacement sign if said test type is not in said at least one predefined subset of said plurality of test types.

14. The apparatus of claim 13, wherein said logic is configured to predict said conditional branch instruction will be taken if said sign is negative and to predict said conditional branch instruction will not be taken if said sign is positive.

15. The apparatus of claim 11, further comprising:

a static prediction storage element configured to store said static prediction; and update logic configured to compare said static prediction stored in said static prediction storage element with said outcome of said conditional branch instruction and to update said Agree/Disagree indication with an Agree indication if said static prediction stored in said static prediction storage element and said output are the same and to update said Agree/Disagree indication with a Disagree indication if said static prediction stored in said static prediction storage element and said output are not the same.

16. The apparatus of claim 11, wherein said index comprises a function of a portion of an address of said conditional branch instruction.

17. The apparatus of claim 16, wherein said function comprises an exclusive OR of said portion of said address with a history of outcomes of a plurality of conditional branch instructions.

18. The apparatus of claim 16, wherein said function comprises a concatenation of said portion of said address with a history of outcomes of a plurality of conditional branch instructions.

19. The apparatus of claim 11, wherein an instruction set of the microprocessor is an x86 instruction set.

20. A branch prediction apparatus within a microprocessor comprising:
   a static branch predictor, configured to receive a conditional branch instruction having a test type, and to output a static prediction based on said test type;
   a branch history table, coupled to said static branch predictor, having an array of storage elements each for storing an Agree/Disagree indicator, said indicator indicating whether a previous static prediction agreed/disagreed with a previously resolved static prediction; and
   correlation logic, coupled to said static branch predictor and to said branch history table, configured to obtain an Agree/Disagree indicator from said branch history table, and to output said static prediction if said Agree/Disagree indicator indicates Agree, and to output the opposite of said static prediction if said Agree/Disagree indicator indicates Disagree.

21. The branch prediction apparatus of claim 20, wherein said static branch predictor makes said static prediction based on whether said conditional branch instruction test type is in at least one predefined subset of test types of the microprocessor's instruction set.

22. The branch prediction apparatus of claim 21, wherein said at least one predefined subset of test types comprises: overflow, zero, carry, parity and sign.

23. The branch prediction apparatus of claim 21, wherein said static branch predictor receives a displacement sign with said conditional branch instruction, and makes said static prediction based on said displacement sign if said test type is not in said at least one predefined subset of said test types.

24. The branch prediction apparatus of claim 23, wherein said static branch predictor predicts said conditional branch instruction will be taken if said displacement sign is negative predicts said conditional branch instruction will not be taken if said displacement sign is positive.

25. The branch prediction apparatus of claim 20, further comprising:
   a static prediction storage element configured to store said static prediction; and
   update logic, coupled to said storage element, for comparing said static prediction stored in said static prediction storage element with a resolved conditional branch instruction, and updating said Agree/Disagree indicator with an Agree indication if said static prediction stored in said static prediction storage element and said resolved conditional branch instruction are the same.

26. The branch prediction apparatus of claim 20, further comprising an index input for indexing into said array of storage elements, said index input being a function of a portion of an address of said conditional branch instruction.

27. The branch prediction apparatus of claim 26, wherein said function comprises an exclusive OR of said portion of said address with a history of outcomes of a plurality of conditional branch instructions.

28. The branch prediction apparatus of claim 26, wherein said function comprises a concatenation of said portion of said address with a history of outcomes of a plurality of conditional branch instructions.

29. The branch prediction apparatus of claim 20, further comprising instruction fetch logic coupled to said static branch predictor, for fetching a next sequential instruction if the branch predictor apparatus indicates said conditional branch instruction will not be taken.

30. The branch prediction apparatus of claim 20, wherein an instruction set of the microprocessor is an x86 instruction set.

31. A method for performing branch prediction in a microprocessor, comprising:
   making a static prediction of an outcome of a conditional branch instruction based on a test type of said conditional branch instruction specifying a condition upon which said conditional branch instruction will be taken;
   providing an Agree/Disagree indication of whether a previous static prediction of a previous outcome of said conditional branch instruction agreed with said previous outcome; and
   outputting said static prediction if said Agree/Disagree indication agrees with said static prediction and outputting a value opposite said static prediction if said Agree/Disagree indication disagrees with said static prediction.

32. The method of claim 31, wherein said making said static prediction comprises making said static prediction based on whether said test type is in at least one predefined subset of a plurality of test types defined in the microprocessor's instruction set.

33. The method of claim 32, wherein said at least one predefined subset of test types comprises at least one of the following test types and combinations thereof: overflow, zero, carry, parity and sign.

34. The method of claim 31, wherein said making said static prediction comprises making said static prediction based on a branch target address displacement sign of said conditional branch instruction if said test type is not in said at least one predefined subset.

35. The method of claim 34, wherein said making said static prediction based on a branch target address displacement sign comprises predicting said conditional branch instruction will be taken if said sign is negative and predicting said conditional branch instruction will not be taken if said sign is positive.

36. The method of claim 31, further comprising:
   comparing said static prediction with said outcome of said conditional branch instruction and updating said Agree/Disagree indication with an Agree indication if said static prediction and said outcome are the same and updating said Agree/Disagree indication with a Disagree indication if said static prediction and said outcome are not the same.

37. The method of claim 31, further comprising selecting said Agree/Disagree indication from among a plurality of Agree/Disagree indications according to a function of a portion of an address of said conditional branch instruction.

38. The method of claim 37, wherein said function comprises an exclusive OR of said portion of said address with a history of outcomes of a plurality of conditional branch instructions.

39. The method of claim 37, wherein said function comprises a concatenation of said portion of said address with a history of outcomes of a plurality of conditional branch instructions.

40. The method of claim 31, further comprising:
   fetching a next sequential instruction if said outputting indicates said conditional branch instruction will not be taken and fetching an instruction at a branch target address of said conditional branch instruction if said outputting indicates said conditional branch instruction will be taken.

41. The method of claim 31, wherein an instruction set of the microprocessor is an x86 instruction set.

* * * * *